(12) United States Patent
Insalaco et al.

(10) Patent No.: US 6,317,966 B1
(45) Date of Patent: Nov. 20, 2001

(54) APPARATUS FOR INSTALLING A BAFFLE IN A TUBULAR MEMBER

(75) Inventors: Jeffrey Lee Insalaco, Brandon; William Marv Johnson, Pelshatchie; David Michael Halbig, Brandon, all of MS (US)

(73) Assignee: Norsk Hydro, A.S., Oslo (NO)

( * ) Notice: Subject to any disclaimer, the term of this patent is extended or adjusted under 35 U.S.C. 154(b) by 0 days.

(21) Appl. No.: 09/648,003

(22) Filed: Apr. 28, 1998

Related U.S. Application Data

(62) Division of application No. 08/628,924, filed on Apr. 8, 1996, now Pat. No. 5,761,810.

(51) Int. Cl.[7] .................................................. B23P 15/26
(52) U.S. Cl. .................. 29/727; 29/890.052; 29/890.043
(58) Field of Search ........................... 29/890.052, 727, 29/890.08, 890.44, 522.1, 523; 138/89; 165/76

(56) References Cited

U.S. PATENT DOCUMENTS

| | | | |
|---|---|---|---|
| 4,762,152 | 8/1988 | Claussen | 138/89 |
| 4,779,445 * | 10/1988 | Rabe | 29/727 |
| 4,829,660 * | 5/1989 | Everett et al. | 29/727 |
| 4,831,702 * | 5/1989 | Vossbrinck et al. | 29/727 |
| 4,844,152 | 7/1989 | Hummert | 165/76 |
| 5,165,470 | 11/1992 | Maekawa et al. | 165/76 |
| 5,233,756 * | 8/1993 | le Gauyer | 29/890.043 |
| 5,481,800 * | 1/1996 | Hutto et al. | 29/890.052 |
| 5,761,810 * | 6/1998 | Insalaco et al. | 29/890.052 |
| 5,799,396 * | 9/1998 | Bosch et al. | 29/890.052 |
| 5,915,472 * | 6/1999 | Takikawa et al. | 165/158 |
| 6,082,447 * | 7/2000 | Insalaco et al. | 165/174 |
| 6,119,340 * | 9/2000 | Insalaco et al. | 29/890.052 |

FOREIGN PATENT DOCUMENTS

| | | | |
|---|---|---|---|
| 228684 | 7/1987 | (EP) | F28F/9/02 |
| 63-239062 | 9/1988 | (JP) | B25B/27/02 |

* cited by examiner

*Primary Examiner*—I Cuda Rosenbaum
(74) *Attorney, Agent, or Firm*—Gary M. Hartman; Domenica N. S. Hartman

(57) ABSTRACT

A method and tool for installing a baffle in a tubular member, such as a heat exchanger manifold. The method and tool are adapted to use a baffle having a closed base that acts to obstruct the flow of a fluid within the tubular member, and further having a sidewall extending axially from the perimeter of the base so as to form a recess in the baffle. The tool is generally composed of a sleeve having an elastically and radially deformable end, such as a number of cantilevered members adapted to be elastically bent radially outward. Radially outward deformation of the sleeve enables the sleeve to securely grip the baffle, maintain the orientation of the baffle during its insertion into the tubular member, and then plastically deform the sidewalls of the baffle in order to secure the baffle to the wall of the tubular member.

9 Claims, 3 Drawing Sheets

APPARATUS FOR INSTALLING A BAFFLE IN A TUBULAR MEMBER

This application is a divisional of Ser. No. 08/628,924, filed Apr. 8, 1996, now U.S. Pat. No. 5,761,810.

The present invention generally relates to methods for installing a baffle in a tubular member. More particularly, this invention relates to methods and tools for inserting and securing a baffle within a tubular member, such as a manifold of a heat exchanger.

BACKGROUND OF THE INVENTION

Baffles are used in a variety of applications to direct the flow of fluids and gases through tubular members. One such application is for use in the manifolds of heat exchangers. Generally, heat exchangers include a pair of manifolds and a series of tubes interconnected between the manifolds. To optimize the efficiency of a heat exchanger, the flow of a heat transfer fluid, which may be gas or liquid, through the tubes is often controlled by placing baffles within the manifolds, such that separate and parallel flow regions can be established within the heat exchanger by appropriately routing the fluid through the tubes of the heat exchanger.

The prior art has suggested various methods and tools for installing baffles, an example of which is U.S. Pat. No. 5,052,478 to Nakajima et al. Nakajima et al. teach the insertion of partitioning plates through circumferential slots formed in the wall of a heat exchanger manifold. A notable disadvantage of this method is that inserting plates through the manifold wall does not itself positively secure the plates to the manifold. Therefore, the plates must be soldered, brazed or welded to the manifold, or an additional fastening member is required to secure the plates. However, attaching the plates with solder and the like can contaminate the interior of the manifold with foreign matter, such as solder flux. In addition, the presence of slots in the manifold wall substantially weakens the manifold, reducing its capacity to withstand numerous temperature and pressure cycles.

As such, others in the art have proposed various other methods and tools for installing a baffle within a manifold without compromising the structural integrity of the manifold. For instance, commonly-assigned U.S. Pat. No. 4,762,152 to Clausen teaches a tool for installing a baffle within a manifold so as to completely avoid the necessity of cutting slots in the manifold. Baffles installed in this manner are generally cup-shaped, with a closed base and an axially-extending annular sidewall that forms a cavity with the base. The radial thickness of the sidewall increases in thickness in a direction away from the base. These baffles are installed with a tool having a head adapted to be inserted into the recess of the baffles. Once the baffle is appropriately positioned within the manifold, the tool is retracted from the recess, forcing the sidewalls radially outward as the tool is withdrawn. In so doing, the sidewall is forced against the inner surface of the manifold, thus plastically deforming the baffle and manifold so as to secure the baffle in place.

While Clausen teaches an uncomplicated installation tool, others in the prior art have resorted to more complicated tool designs, as evidenced by U.S. Pat. No. 5,165,470 to Maekawa et al., which teaches an installation tool having a narrow shaft threadably connected to a radially larger head that remains within the baffle after installation. The tool must be rotated during installation of the baffle, which considerably complicates the installation process. Further complicating the installation method of Maekawa et al. is the requirement of a stop member that must be inserted with the installation tool to prevent the baffle from being inadvertently removed with the tool. Without the stop member, a newly installed baffle would tend to be removed or at least dislocated while the tool is being retracted. Finally, tools of the type taught by Maekawa et al. can be difficult to initially insert into a baffle, particularly if it is desirable to use such tools on an automated assembly line.

Other installation methods and tools have been suggested by which the necessary radial outward force required to secure a baffle to the wall of a manifold is created by a forward-moving shaft rather than a rearward-moving tool of the type taught by Maekawa et al. and Clausen. For example, Japanese Application No. 63-239062 to Nishishita teaches a tool for installing a bowl-shaped baffle having a closed base and an axially-extending, radially-diverging sidewall of uniform thickness. To secure the baffle in place, this tool applies a radially outward force on the baffle's sidewalls with a radial arrangement of fingers that are mechanically forced radially outward with a rod. The bowl-shaped baffle employed by Nishishita necessarily has a larger diameter than the manifold passage due to the rather mechanically inefficient manner in which the baffle is only locally expanded by the radial fingers. However, this shape renders the baffle difficult to temporarily secure on the tool prior to insertion into the manifold, and also resists and complicates the initial insertion of the baffle into the manifold. Also, localized expansion of the baffle sidewall with the radial fingers can allow leakage if the diameter of the baffle is compromised to facilitate its insertion into the manifold. Finally, such baffles are more prone to becoming dislodged due to the limited extent to which the sidewall is deformed to secure the baffle in place.

Accordingly, it can be seen that an improved method is needed for installing and securing a baffle in a tubular member, such as a heat exchanger manifold. More particularly, such a method should provide for secure attachment of a baffle without compromising the structural integrity of the manifold, employ an installation tool that is capable of readily and securely gripping the baffle prior to and during installation, enable the baffle to be shaped to permit the tool to readily grasp the baffle and thereby facilitate insertion of the baffle into the manifold, provide for uniform securement of the baffle against the walls of the manifold, and enable the tool to be removed without inadvertently removing the baffle with the tool.

SUMMARY OF THE INVENTION

It is an object of this invention to provide a method for installing and securing a baffle in a tubular member while maintaining the structural integrity of the tubular member.

It is a further object of this invention to provide an installation tool that is capable of securely gripping the baffle prior to its installation in the tubular member.

It is another object of this invention that such a tool secures the baffle to the tubular member by uniformly deforming the sidewall of the baffle.

It is yet another object of this invention that the tool is configured to avoid inadvertently removing the baffle from the tubular member during removal of the installation tool.

In accordance with this invention, a method is provided that employs an installation tool for installing and securing a baffle to an interior wall surface of a tubular member, such as a heat exchanger manifold. The method and tool are adapted to use a baffle having a closed base that acts to obstruct the flow of a fluid within the tubular member, and further having a sidewall extending axially from the perimeter of the base so as to form a recess in the baffle. Advantageously, the tool is adapted to work well with a baffle whose sidewall has a substantially constant radial thickness and diameter, thereby facilitating installation and securement of the baffle with the tube member and promoting a fluid-tight seal with the tubular member wall.

The installation tool of this invention is generally composed of a sleeve having an elastically and radially deformable end. In a preferred embodiment, the sleeve is formed to have longitudinally-extending cantilevered members adapted to be elastically bent radially outward. In particular, radially outward deformation of the sleeve enables the sleeve to both securely grip the baffle as the baffle is being inserted into the tubular member, and then plastically deform the sidewalls of the baffle in order to secure the baffle to the wall of the tubular member. As such, the sleeve is configured to perform several operations. First, the sleeve is initially undeformed such that the end of the sleeve is sized to be freely inserted into the recess of the baffle. Thereafter, the sleeve is radially and elastically expanded to grip the baffle. Finally, further radial expansion of the end of the sleeve enables a radial force to be exerted that plastically and uniformly deforms the sidewall of the baffle, thereby permanently securing the baffle inside the tubular member without excessively deforming the tubular member.

From the above, it can be seen that the tool of this invention makes possible a method having significant advantages over the prior art. One advantage is that a baffle can be installed without compromising the structural integrity of the tubular member. Rather than cutting a slot through the tubular member, the baffle of this invention is secured to the inner surface by limited deformation of the baffle. Another significant advantage is that the method is compatible with the use of baffles having sidewalls with a constant cross-section and thickness, which can therefore be more uniformly deformed to promote securement of the baffle and a fluid-tight seal with the tubular member. Advantageously, the tool is also configured to apply a more uniform radial force on the sidewall of the baffle, which also promotes securement and a fluid-tight seal. Such a capability is contrary to prior art methods in which only localized portions of the baffle's sidewall are deformed. A further advantage of this invention is that the tool is adapted to securely grip the baffle during insertion, which greatly promotes automation of the installation process. In addition, the tool is configured to completely disengage the baffle after insertion, such that the tool can be retracted from the tubular member without concern for inadvertently removing the baffle with the tool.

Other objects and advantages of this invention will be more apparent after reading the following detailed description taken in conjunction with the drawings provided.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
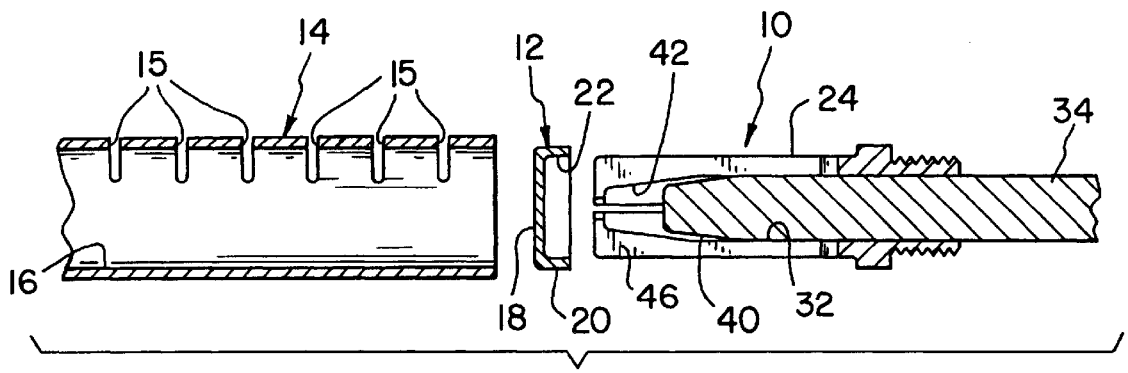
FIG. 1 is a cross-sectional side view of a heat exchanger manifold, a baffle, and a tool for installing and securing the baffle to the manifold in accordance with a first embodiment of this invention.

In accordance with this invention, a method and tool are provided for installing a baffle 12 in a tubular member, such as the heat exchanger manifold 14 depicted in the Figures. The method of this invention entails securing the baffle 12 to an inner surface 16 of the manifold 14, as depicted in FIGS. 2 through 4 and 8 through 10, so as to form an obstruction to flow through the manifold 14. In this manner, the baffle 12 can serve to determine the flow of a cooling fluid through heat exchanger tubes (not shown) inserted into tube ports 15 formed in the manifold 14. Though the ports 15 are shown has being slots, those skilled in the art will appreciate that the ports 15 could be circular, include a riser, or have any other desired shape or configuration.

The baffle 12 shown in the Figures is composed of a closed base 18 and an annularly-shaped sidewall 20 extending axially from the perimeter of the base 18, which together form a recess 22 on one side of the baffle 12. The sidewall 20 preferably extends normal to the base 16 and has a constant cross-section and radial thickness, though it is foreseeable that the sidewall 20 could be tapered with an irregular thickness. As is apparent, the diameter and cross-sectional shape of the baffle 12 should closely correspond to that of the inner surface 16 of the manifold 14, which is shown as circular. While the prior art often requires a slightly oversized baffle to achieve an interference fit with a manifold, baffles employed by this invention can be slightly undersized, as will be explained below.

An installation tool 10 in accordance with a first embodiment of this invention is shown in FIGS. 1 through 6. As illustrated, the tool 10 is composed of a mandrel 34 disposed within the bore 32 of a sleeve 24, the latter of which is shown in greater detail in FIGS. 5 and 6. The diameter and shape of the sleeve 24 approximately correspond to that of the internal diameter of the manifold 14, such as the cylindrical shape shown in the Figures. The sleeve 24 has a forward end 28 that is sized to be received in the recess 22 of the baffle 12, and an oppositely-disposed rearward end 30 through which the mandrel 34 is inserted into the sleeve 24. Threads 48 may be formed on the rearward portion 30 of the sleeve 24 in order to allow the tool 10 to be installed on an actuator or arm of an automated machine.

Figure 4:
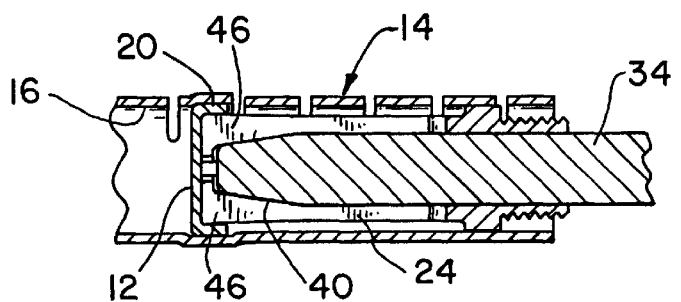
Figure 5:
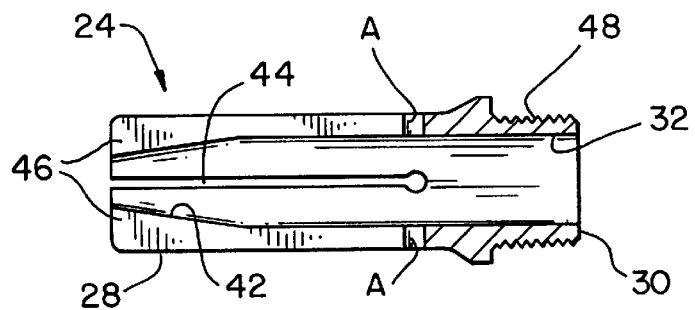
FIG. 5 is a cross-sectional side view of a sleeve portion of the tool of FIGS. 1 through 4.
Figure 6:
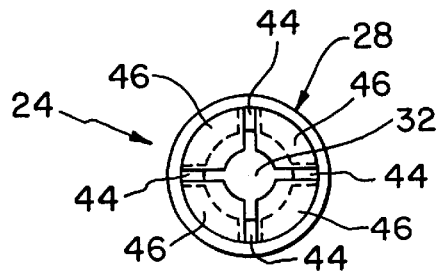
FIG. 6 is an end view of the sleeve portion of FIG. 5.

As best seen in FIGS. 5 and 6, the forward end 28 of the sleeve 24 is composed of four cantilevered members 46 that are delineated by slots 44. The bore 32 in the sleeve 24 terminates with a tapered portion 42 at the forward end 28 of the sleeve 24. As can been seen from FIG. 1, the mandrel 34 also has a tapered portion 40 adapted to cooperate with the tapered portion 42 of the sleeve 24 to elastically bend or deflect the cantilevered members 46 radially outward as the tapered portion 40 of the mandrel 34 is pushed forward into the tapered portion 42 of the sleeve 24. As is apparent from FIGS. 1 through 4, the relative position of the mandrel 34 within the sleeve 24 establishes the effective diameter of the sleeve's forward end 28, as determined by the cantilevered members 46. In this manner, the forward end 28 of the sleeve 24 is able to readily grip, install and secure the baffle 12 within the manifold 14.

Figure 2:
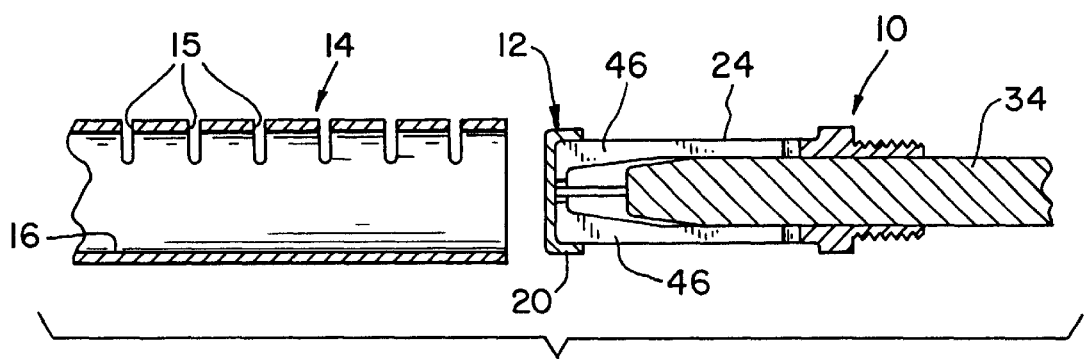
FIGS. 2 through 4 illustrate steps during which the baffle is gripped by the tool, installed in the manifold, and then secured within the manifold, respectively, in accordance with the first embodiment of this invention.
Figure 3:
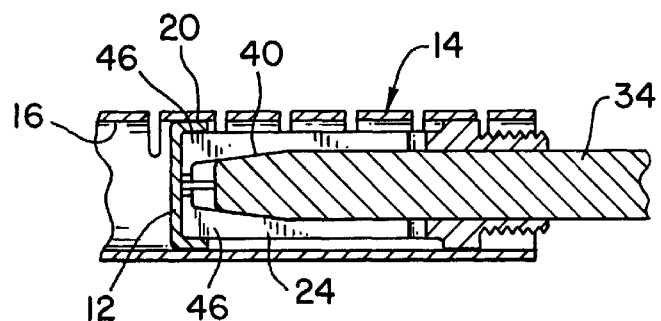

As shown in FIG. 1, the mandrel 34 is sufficiently retracted within the bore 32 of the sleeve 24 in order to allow the forward end 28 of the sleeve 24 to be received in the recess 22. FIG. 2 shows the result of the mandrel 34 being forced slightly further into the bore 32, causing sufficient deflection of the cantilevered members 46 to grip the sidewall 20 of the baffle 12 without deforming the baffle 12. In this manner, the baffle 12 can be readily positioned in the manifold 14 as shown in FIG. 3. From FIGS. 2 and 3, it can be appreciated that the tool 10 of this invention permits the use of a slightly undersized baffle 12 because the position and orientation of the baffle 12 are maintained throughout installation and securement by the forward end 28 of the sleeve 24. Such a capability is in contrast to prior art methods and tooling that rely on an interference fit between a baffle and manifold in order to maintain control of the position and orientation of the baffle during installation and secure the baffle to the manifold. This aspect of the invention is particularly advantageous when, as shown in the Figures, the number and shape of the ports 15 formed in the manifold 14 can make installation of an oversized baffle difficult, and renders the manifold 14 and ports 15 susceptible to damage during installation of prior art oversized baffles.

As shown in FIG. 4, further actuation of the mandrel 34 causes the cantilevered members 46 to be deflected sufficiently to fully expand the forward end 28 of the sleeve 24, such that sidewall 20 of the baffle 12 is plastically deformed in order to permanently secure the baffle 12 in place within the manifold 14. Finally, the mandrel 34 is retracted sufficiently to allow the cantilevered members 46 of the forward end 28 to resume their initial position of FIG. 1. In this manner, the forward end 28 of the sleeve 24 is completely disengaged from the sidewall 20 of the baffle 12, allowing the sleeve 24 to be freely withdrawn from the manifold 14 without any concern for disrupting the placement of the baffle 12 within the manifold 14.

From the above, it can be appreciated that the tool 10 of this invention relies on the elastic bending of the cantilevered members 46 for its operation, and does require an assembly of springs, pins and fasteners that would complicate its manufacture and operation. While various elastically-deformable materials could be used to form the sleeve 24, or at least the forward end 28 and its cantilevered members 46, a preferred material is a spring steel. Advantageously, materials of this type will elastically bend over numerous cycles without succumbing to fatigue fractures.

Another advantage of this invention is that the structural integrity of the manifold 14 is promoted and maintained. Additional slots are not required to enable insertion of the baffle 12 through the manifold wall. In addition, the tool 10 is capable of gently gripping the baffle 12 prior to its insertion in the manifold 14 without deforming the baffle 12, yet with sufficient firmness to maintain the orientation of the baffle 12 on the sleeve 24 throughout installation. Because the tool 10 is able to grip the baffle 12 in this manner, the typical interference fit required between the baffle 12 and the manifold 14 can be greatly reduced or eliminated. This aspect of the invention is further promoted by the sidewall 20 of the baffle 12 having a uniform diameter and thickness, rather than a tapered sidewall that promotes sealing between the baffle 12 and manifold 14 but would likely damage the ports 15, excessively deform the manifold 14, and render the baffle 12 difficult to grip with the tool 10.

Yet another advantage of this invention is that, once the baffle 12 is properly in position, the tool 10 is able to plastically deform the sidewall 20 of the baffle 12 to secure the baffle 12 in place within the manifold 14. Advantageously, the cantilevered members 46 define essentially the entire perimeter of the sleeve's forward end 28, with only minimal interruption due to the presence of the slots 44. As such, the cantilevered members 46 are able to apply a very uniform radial force on the sidewall 20 of the baffle 12, such that the sidewall 20 is more uniformly deformed. Again, such a capability avoids the prior art requirement for an interference fit between the baffle 12 and the manifold 14 in order to ensure full contact between the baffle 12 and the entire perimeter of the inner surface 16 of the manifold 14. As such, a fluid-tight seal can be readily achieved with the baffle 14. The uniform force applied by the cantilevered members 46 also avoids excessive localized distortion of the manifold 14, a tendency that is problematic with manifolds of the type shown in the Figures, where the portions of the manifold 14 between the ports 15 are highly susceptible to damage if excessive or localized force is applied.

Finally, the tool 10 of this invention can be readily disengaged from the baffle 12 prior to removing the tool 10 from the manifold 14. As such, the tool 10 can be removed without inadvertently removing or disturbing the baffle 12. This aspect of the invention also reduces the likelihood that the tool 10 would become lodged within the manifold 14.

A tool 110 in accordance with a second embodiment of this invention is shown in FIGS. 7 through 10. As illustrated, this tool 110 is similar to the tool 10 of FIGS. 1 through 6 to the extent that it is composed of a mandrel 134 disposed within a sleeve 124. The sleeve 124 has a forward end 128 that is sized to be received in the recess of the baffle 12, and through which the mandrel 134 is inserted into the sleeve 124. As with the sleeve 24 of the first embodiment, the opposite end of the sleeve 124 is adapted to enable the tool 110 to be installed on appropriate actuating equipment. Also according to the first embodiment of this invention, the forward end 128 of the sleeve 124 is composed of cantilevered members that are delineated by slots. The bore formed by the sleeve 124 includes a tapered portion 142 at the forward end 128, which approximately corresponds in shape to a mating tapered end 140 of the mandrel 134. As seen in FIGS. 7 through 10, the tapered end 140 of the mandrel 134 and the tapered portion 142 of the sleeve 124 decrease in diameter in a direction away from the forward end 128 of the sleeve 124. As such, the tool 110 of this embodiment differs from the tool 10 of the first embodiment, in that the tapered end 140 is adapted to elastically bend or deflect the cantilevered members radially outward when the mandrel 134 is actuated in a direction away from the manifold 14.

Figure 7:
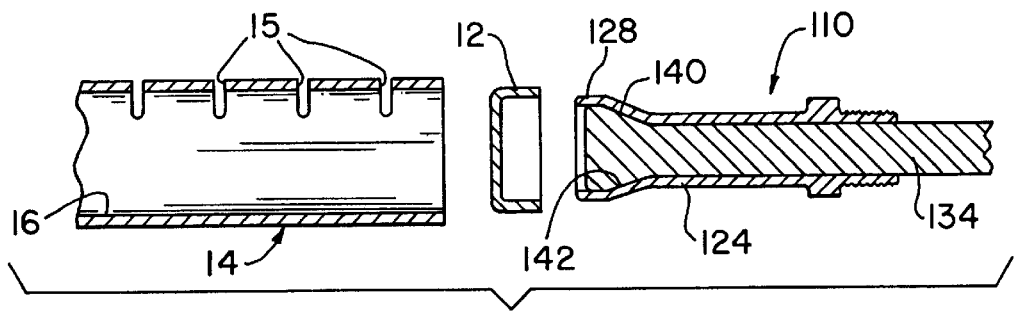
FIGS. 7 through 10 show a tool and steps for installing and securing a baffle in accordance with a second embodiment of this invention.
Figure 8:
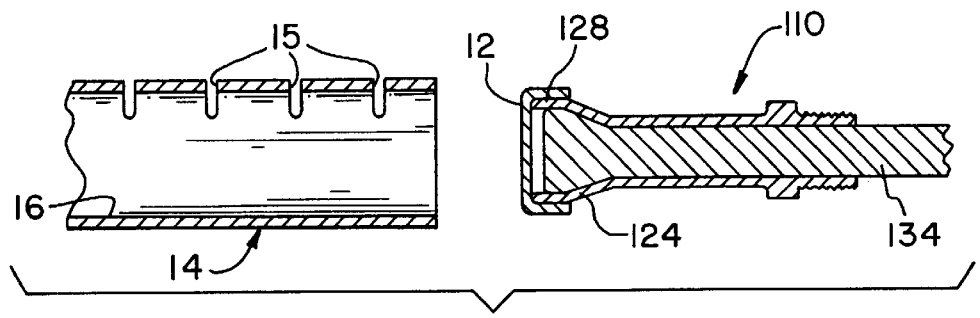
Figure 9:
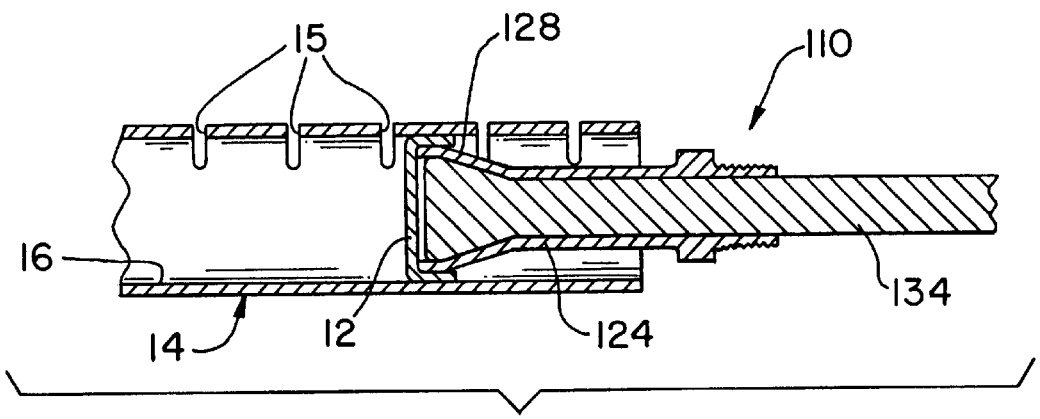
Figure 10:
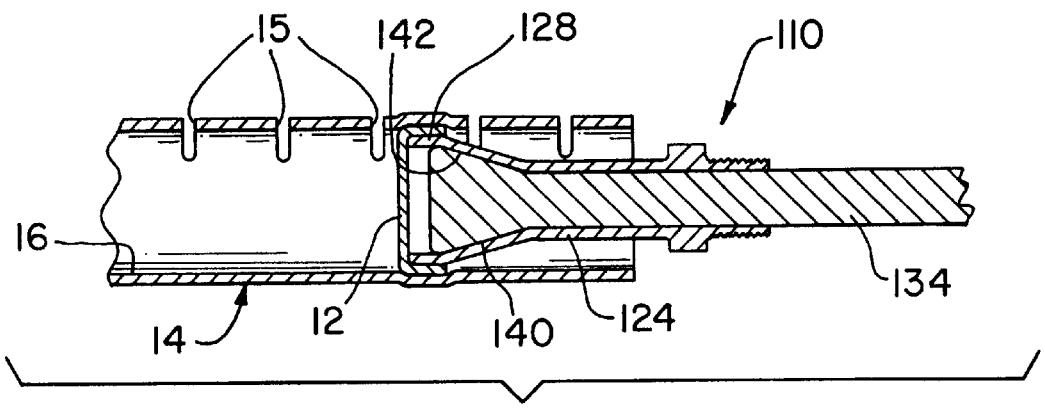

With the above configuration, it can be seen that the tool 110 of this embodiment is able to grip, position and plastically deform the baffle 12 with the same proficiency as that possible with the tool 10 of the first embodiment. In FIG. 7, the mandrel 134 is shown positioned within the sleeve 124 so as to allow the forward end 128 of the sleeve 124 to engage the baffle 12. FIG. 8 shows the result of the mandrel 134 being actuated within the sleeve 124, causing sufficient deflection of the cantilevered members to grip the baffle 12. After the baffle 12 is positioned in the manifold 14 as shown in FIG. 9, the mandrel 134 is further actuated with the sleeve 124, as shown in FIG. 10, to fully expand the forward end 128 of the sleeve 124, such that the baffle 12 is plastically deformed and thereby permanently secured within the manifold 14.

An advantageous aspect of the tool 110 shown in FIGS. 7 through 10 is that tooling maintenance and replacement is facilitated. According to this embodiment, the sleeve 124 is preferably formed to have a greater hardness than the mandrel 134, such that wear primarily occurs with the mandrel 134. Because the mandrel 134 is installed through the forward end 128 of the sleeve 124, i.e., the end exposed when the sleeve 124 is retracted during operation, the mandrel 134 can be readily replaced when necessary. To further reduce operation and maintenance costs, the mandrel 134 is manufactured as a two-piece unit, such that only the tapered end 140 of the mandrel 124 need by replaced.

While the invention has been described in terms of a preferred embodiment, it is apparent that other forms could be adopted by one skilled in the art. For example, different materials could be used, the appearance and configuration of the tools 10 and 110, manifold 14 and baffle 12 could be other than that shown, and the tools 10 and 110 could be employed in other assembly processes. Accordingly, the scope of our invention is to be limited only by the following claims.

What is claimed is:

1. An installation tool for installing a baffle in a tubular member, the baffle having a base and an annular-shaped sidewall extending from a perimeter of the base so as to form a recess therewith, the installation tool comprising:

a sleeve having a first end receivable within the recess of the baffle and engagable with the sidewall, the first end of the sleeve being formed of an elastically deformable material; and means for radially and elastically deforming the first end of the sleeve, the deforming means being operable to elastically and radially expand the first end so as to grip the sidewall of the baffle, further elastically and radially expand the first end so as to plastically deform the sidewall of the baffle and thereby secure the baffle within the tubular member, and elastically and radially contract the first end so as to enable the first end to be disengaged from the baffle.

2. An installation tool as recited in claim 1, wherein the first end of the sleeve comprises a plurality of longitudinally-extending cantilevered members.

3. An installation tool as recited in claim 1, wherein the sleeve is tubular-shaped with a tapered bore at the first end thereof.

4. An installation tool as recited in claim 3, wherein the deforming means is a mandrel having a shaft and a distal end receivable within the first end of the sleeve.

5. An installation tool as recited in claim 4, wherein the distal end of the mandrel has a tapered portion complementary to the tapered bore of the sleeve.

6. An installation tool as recited in claim 5, wherein the tapered portion of the mandrel and the tapered bore of the sleeve increase in diameter in a direction away from the distal end of the mandrel and the first end of the sleeve, respectively.

7. An installation tool as recited in claim 5, wherein the tapered portion of the mandrel and the tapered bore of the sleeve decrease in diameter in a direction away from the distal end of the mandrel and the first end of the sleeve, respectively.

8. An installation tool as recited in claim 7, wherein the tapered bore of the sleeve has a greater hardness than the tapered portion of the mandrel.

9. An installation tool as recited in claim 1, further comprising the baffle, the sidewall of the baffle having a substantially uniform diameter and a substantially uniform thickness in a radial direction.

* * * * *